United States Patent
Vyas et al.

(10) Patent No.: US 10,963,797 B2
(45) Date of Patent: Mar. 30, 2021

(54) SYSTEM FOR ANALYZING MACHINE DATA

(71) Applicant: Caterpillar Inc., Peoria, IL (US)

(72) Inventors: Bhavin J. Vyas, Edwards, IL (US); Ankitkumar P. Dhorajiya, Dunlap, IL (US); Vishnu G. Selvaraj, Trichy (IN); William D. Hankins, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 613 days.

(21) Appl. No.: 15/428,543

(22) Filed: Feb. 9, 2017

(65) Prior Publication Data
US 2018/0225578 A1    Aug. 9, 2018

(51) Int. Cl.
G06N 5/02    (2006.01)
G06N 20/00   (2019.01)
G06Q 10/00   (2012.01)

(52) U.S. Cl.
CPC ............ G06N 5/025 (2013.01); G06N 20/00 (2019.01); G06Q 10/20 (2013.01)

(58) Field of Classification Search
CPC ......... G06N 5/025; G06N 20/00; G06Q 10/20
See application file for complete search history.

(56) References Cited

U.S. PATENT DOCUMENTS

| | | | |
|---|---|---|---|
| 6,330,499 B1 | 12/2001 | Chou et al. | |
| 6,336,065 B1 | 1/2002 | Gibson et al. | |
| 6,675,639 B1* | 1/2004 | Schricker | G01M 15/102 73/114.01 |
| 7,080,290 B2 | 7/2006 | James et al. | |
| 7,089,154 B2 | 8/2006 | Rasmussen et al. | |
| 7,233,886 B2 | 6/2007 | Wegerich et al. | |
| 7,242,311 B2* | 7/2007 | Hoff | E02F 9/20 340/425.5 |
| 7,539,597 B2 | 5/2009 | Wegerich et al. | |
| 7,739,096 B2 | 6/2010 | Wegerich et al. | |
| 7,764,188 B2* | 7/2010 | O'Neal | G05B 9/03 340/517 |
| 7,957,936 B2 | 6/2011 | Eryurek et al. | |
| 8,014,974 B2 | 9/2011 | Doddek et al. | |
| 8,126,679 B2 | 2/2012 | Jammu et al. | |

(Continued)

FOREIGN PATENT DOCUMENTS

WO    2008054309    8/2008

*Primary Examiner* — Alexey Shmatov
*Assistant Examiner* — Tri T Nguyen
(74) *Attorney, Agent, or Firm* — Harrity & Harrity LLP

(57) ABSTRACT

A system for remote monitoring of a machine is provided. The system includes a data store to store machine data associated with an operation of the machine. The system includes an analyzer comprising a plurality of analytics engines to analyze the machine data. The analyzer selects one or more analytics engines based at least on one of machine data and a type of the machine. The analyzer is further configured to analyze machine data using the selected one or more analytics engines and to determine a plurality of exceptions. The system includes a rules engine to process at least two of the plurality of exceptions and determine a smart exception, wherein the smart exception is a hierarchical combination of the at least two of the plurality of exceptions. The system includes an interface to display a notification to a user in the event of a smart exception.

20 Claims, 4 Drawing Sheets

(56) References Cited

U.S. PATENT DOCUMENTS

| | | | |
|---|---|---|---|
| 8,306,797 B2 * | 11/2012 | Furem | E02F 9/267 |
| | | | 703/8 |
| 8,442,853 B2 | 5/2013 | Abbott | |
| 8,868,288 B2 | 10/2014 | Plante et al. | |
| 8,886,390 B2 | 11/2014 | Maeng | |
| 9,323,837 B2 | 4/2016 | Zhao et al. | |
| 2003/0115019 A1 | 6/2003 | Doddek et al. | |
| 2004/0243636 A1 | 12/2004 | Hasiewicz et al. | |
| 2005/0154542 A1 * | 7/2005 | Frerichs | G01H 17/00 |
| | | | 702/56 |
| 2009/0030753 A1 | 1/2009 | Senturk-Doganaksoy et al. | |
| 2010/0131800 A1 * | 5/2010 | Fujimaki | G06N 7/005 |
| | | | 714/37 |
| 2010/0289643 A1 * | 11/2010 | Trundle | G08C 19/16 |
| | | | 340/545.1 |
| 2011/0320172 A1 * | 12/2011 | Doddek | G05B 23/0235 |
| | | | 702/183 |
| 2013/0159787 A1 * | 6/2013 | Yingling, Jr. | G06F 11/008 |
| | | | 714/47.3 |
| 2014/0336984 A1 | 11/2014 | Starr | |
| 2015/0376868 A1 * | 12/2015 | Jackson | E02F 9/2025 |
| | | | 701/50 |
| 2015/0379414 A1 * | 12/2015 | Yeh | G06N 5/022 |
| | | | 706/11 |
| 2016/0125674 A1 * | 5/2016 | Wohlgemuth | G07C 5/08 |
| | | | 701/29.3 |
| 2016/0363503 A1 * | 12/2016 | Matsukawa | G01M 3/3272 |
| 2017/0076209 A1 * | 3/2017 | Sisk | G05B 23/024 |
| 2017/0178030 A1 * | 6/2017 | Pal | G06F 17/5009 |
| 2017/0236067 A1 * | 8/2017 | Tjiong | G06F 8/34 |
| | | | 706/11 |
| 2018/0193579 A1 * | 7/2018 | Hanrahan | A61M 16/01 |
| 2019/0004484 A1 * | 1/2019 | Cussonneau | G05B 13/0265 |

* cited by examiner

SYSTEM FOR ANALYZING MACHINE DATA

TECHNICAL FIELD

The present disclosure relates to analysis of machine data. More particularly, the present disclosure relates to system for analyzing machine data representative of operating conditions of a machine.

BACKGROUND

Machines are typically equipped with sensors for measuring operating conditions such as engine RPM, oil pressure, water temperature, oil contamination, electric motor current, hydraulic pressure, system voltage, and the like. Further, additional sensors may measure other machine application conditions, such as payload, tire performance, underfoot conditions, and the like. In some cases, storage systems are provided on the machine or provided remotely to store the machine data supplied by the sensors for machine diagnostics. Service personnel, condition monitoring analyst, site planner and fleet advisor use a condition monitoring tool, examine the stored machine data to get a better picture of the causes of the failure and evaluate the machine's operation. Service personnel and fleet advisor use condition monitoring tool to make informed maintenance, repair or component replacement decisions. Such condition monitoring tools utilize various analytical engines and knowledge sources to analyze machine data, identify exceptions (or adverse conditions), and generate reports as a result of the analysis.

Typically, an exception is generated by an analytical engine when a machine fails to conform to predefined operating conditions/principles of the machine. However, exceptions generated by condition monitoring tools are reviewed manually by service personnel to identify the associated problem(s) with the machine. Thus, it is very costly and time consuming for the service personnel to review all of the exceptions for a fleet of machines in this manner. Moreover, in some cases, similar types of exceptions are generated by different analytical engines thus introducing unwanted redundancy in the review process. The service personnel provide recommendations related to maintenance or replacement considering additional information from machine manuals, machine history, and other knowledge sources. These manual steps make the overall machine diagnostics very slow and prone to errors.

U.S. Pat. No. 8,014,974 describes a system and a method for automated analysis of machine data and generating output reports when exceptions in the data are detected. However, the output reports including various exceptions need to be reviewed manually by the service personnel thus making the overall process time consuming and less efficient. The present invention is directed to solving one or more of the problems as set forth above.

SUMMARY

In an aspect of the present disclosure, a system for analyzing machine data associated with an operation of a machine is provided. The system includes a data store configured to store machine data. The system includes an analyzer configured to analyze machine data and determine a plurality of exceptions. The analyzer comprises a plurality of analytics engines for analyzing machine data. The analyzer is configured to select one or more analytics engines from the plurality of analytics engines based at least on one of machine data and a type of the machine. The system includes a rules engine configured to process at least two of the plurality of exceptions to determine a smart exception. The smart exception is a hierarchical combination of the at least two of the plurality of exceptions. The rules engine is configured to process at least two of the plurality of exceptions using one or more predefined rules. The system includes an interface to display a notification to a user in the event of a smart exception.

In another aspect of the present disclosure, a system for remotely monitoring a machine is provided. The system includes a data store configured to store machine data. The data store is configured to receive machine data comprising a plurality of machine parameters associated with an operation of the machine. The system includes an analyzer configured to analyze machine data and determine a plurality of exceptions. The analyzer includes a plurality of analytics engines for analyzing machine data and the analyzer is configured to select one or more analytics engines from the plurality of analytics engines based at least on one of a type of the machine parameter and a type of the machine. The analyzer is configured to compare, using the one or more analytics engines, one or more of the plurality of machine parameters with corresponding predetermined thresholds. The analyzer is further configured to determine, using the one or more analytics engines, a plurality of exceptions if one or more of the plurality of machine parameters do not meet the corresponding predetermined thresholds. The system includes a rules engine configured to process at least two of the plurality of exceptions to generate a smart exception. The smart exception is a hierarchical combination of the at least two of the plurality of exceptions. The system includes an interface to display a notification to a user in the event of a smart exception.

In yet another aspect of the present disclosure, there is provided a computer program product comprising a non-transitory computer usable medium having a computer readable program code. The computer readable program is configured to analyze machine data associated with an operation of a machine. The computer readable program code is configured to select one or more analytics engines from a plurality of analytics engines based at least on one of machine data and a type of the machine. The computer readable program code is configured to analyze machine data using the selected one or more analytics engines to determine a plurality of exceptions; The computer readable program code is configured to process at least two of the plurality of exceptions to determine a smart exception. The smart exception is a hierarchical combination of the at least two of the plurality of exceptions. The computer readable program code is configured to display a notification to a user in the event of a smart exception.

DETAILED DESCRIPTION

Figure 1:
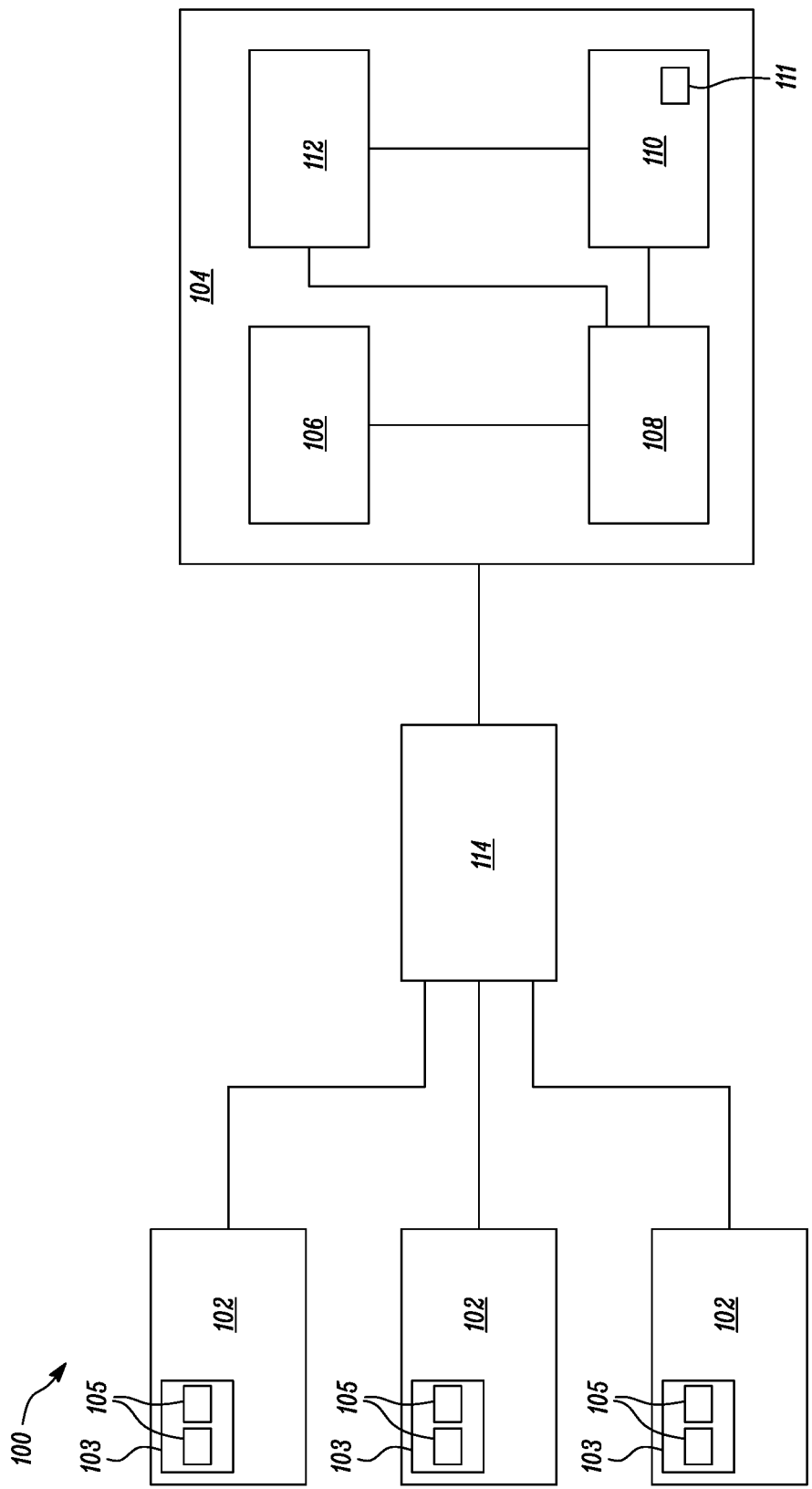
FIG. 1 is a block diagram that illustrates a machine environment for analysis of machine data, in accordance with the concepts of the present disclosure.

Wherever possible, the same reference numbers will be used throughout the drawings to refer to same or like parts. FIG. 1 illustrates a machine environment 100 for analyzing data of a machine 102. In an exemplary embodiment, the machine 102 may be the machine operating within a work site, such as a mine site, a construction site, an oil or gas production site, a marine site, landscaping sites etc. In alternative embodiments, the machine 102 may be operating at multiple work sites. Examples of different types of the machine 102 may include a motor grader, mining truck, a dozer, a hydraulic excavator, a haul truck, an engine, track-type tractor, wheel loader, a power system machine, and the like. For purposes of this disclosure, the present invention is described in connection with a remotely-located machine however the present invention is equally well-suited for use with the machines having on-board control and/or analytics systems which analyze the machine data at the site. In FIG. 1, the machine environment 100 is depicted as including three machines 102; however, the present invention is equally applicable for the machine environment 100 having a greater or lesser number of machines 102. Further, the present invention is described in connection with the analysis of data collected from one machine 102; however, the invention may be utilized to analyze data collected from one machine 102 or a plurality of machines 102. In case of plurality of machines, the machines 102 may be of similar or different types.

The machine 102 includes a machine monitoring module 103 to monitor various operating conditions of the machine 102. The machine monitoring module 103 includes a plurality of control modules associated with various components of the machine 102. Examples of the various control modules may include, but not limited to, an engine control module associated with an engine of the machine 102, a transmission control module associated with a transmission system of the machine 102, drivetrain control module associated with a drivetrain of the machine 102, brake control module associated with a braking system of the machine 102, and body control module associated with the body of the machine 102 such as for controlling door locks, electronic windows, headlamps and so on. Each of the control modules may be configured to provide data related to operating conditions of the associated component of the machine 102. The machine monitoring module 103 comprises a plurality of sensors 105 residing on various components of the machine 102 to collect machine data. The sensors 105 collect data related to one or more machine parameters i.e. the operating conditions of the machine 102, such as, for example, engine RPM, engine oil pressure, water temperature, boost pressure, oil contamination, electric motor current, hydraulic pressure, system voltage, exhaust temperature, and the like and related to other application conditions of the machine 102, such as, for example, payload, tire performance, underfoot conditions and the like. Additionally, the machine monitoring module 103 may collect data related to machine inspections, repair history, and site conditions.

The machine environment 100 includes a system 104 for storing and analyzing data of the machine 102. The system 104 includes a data store 106, an analyzer 108, a rules engine 110, and an interface 112. The system 104 includes the data store 106 which is communicatively coupled to the machine 102. The data store 106 is configured to receive and store machine data from the machine 102. In some embodiments, the data store 106 receives machine data from the machine monitoring module 103 associated with the machine 102.

The data store 106 may be further configured to receive non-electronic data from various sources such as customer ERP systems, fluid analysis system, and machine inspection systems. The non-electronic data may include work orders, fluid samples, maintenance schedule records, and inspection records. As an example, the data store 106 collects 500,000 work orders, 50,000 fluid samples, 7000 maintenance schedule records, and 2000 inspection records every month. Further, the data collected by the machine monitoring module 103 may be continuous or discrete depending on the type of data and associated mechanism of collecting the data.

As shown in FIG. 1, the data store 106 is connected to the machine 102 via a communication network 114. In an exemplary embodiment, the communication between the machine 102 and the data store 106 may happen over a wireless network. Examples of the wireless networks include a Wi-Fi network, a Zigbee network, a worldwide interoperability for microwave access (WiMAX) network, a cellular communication network, a satellite communication network, or any other suitable wireless network. In another embodiment, the communication network 114 may include alternate communication means, such as a virtual private network, an Ethernet network, a modem with access to public telephone lines, or any other wired network.

The machine data is relayed via the communication network 114 to the data store 106 and stored in the data store 106. The data may be relayed from the machine 102 as streaming data in real time, as is well known in the art. Alternatively, the data may be stored on the machine 102 and batched, or relayed to the data store 106 in packets. The packets may be relayed frequently, such as, for example, every minute, or the packets may be sent more infrequently, such as, for example, at the end of a work shift or every twenty-four hours. In some cases, the data may be relayed from the machine 102 as small messages. As an example, the data store 106 collects 350 Giga Bytes (GB) of batched data files and 5 GB of real time streaming data every month.

The data store 106 stores the machine data received from the machine 106 via the communications network 114. The data store 106 may be comprised of a single database, or it may be comprised of a plurality of databases located on one or more computing devices or servers. In various embodiments, the data store 106 may be located external to the system 104 and may be communicatively coupled to the machine 102 and various components of the system 104. The data store 106 may further comprise a processor or controller (not shown) for managing the storage of machine data.

The system 104 may be located at the work site or elsewhere. In case the machine environment 100 includes a plurality of machines 102 from more than one work site, the system 104 need not be associated with a single work site. The system 104 may be in a central location to which machine data from a plurality of work sites is delivered for processing and analysis. Alternatively, the system 104 may be located on the machine 102 and operably connected to the machine monitoring module 103 to collect information. Further, the system 104, while located on one machine, may, via the communication network 114, continue to collect data from the plurality of machines 102 located at one or more work sites.

The system 104 includes the analyzer 108 to analyze the machine data. The analyzer 108 is communicatively coupled to the data store 106. The analyzer 108 receives machine data from the data store 106 and analyzes the received machine data for detecting issues with the machine 102 as well as predicting upcoming issues with the machine 102. In case of plurality of machines, the analyzer 108 may be configured to analyze machine data for a plurality of machine types. The analyzer 108 performs various analytical modeling on received machine data to generate plots, heat maps, trends, events, and the like suitable for machine diagnostics and prognostics. The analyzer 108 comprises a plurality of analytics engines (not shown in FIG. 1) to perform different types of analysis on machine data. For example, the analyzer 108 may comprise an analytics engine to determine a rate of change of engine oil pressure in last 100 hours using the engine oil pressure data received from the data store 106.

For each machine type, the analyzer 108 may be preconfigured with a list of predetermined thresholds and/or predetermined ranges of values that indicate a "normal" operating condition for each machine parameter. In one embodiment, the analyzer 108 analyzes machine data to determine if it is outside of the "normal" operating condition. More specifically, for each machine parameter, the analyzer 108 checks whether the machine parameter meets the corresponding predetermined threshold and/or predetermined range of values. If any machine parameter does not meet the corresponding predetermined threshold and/or predetermined range of values, the analyzer 108 triggers an exception. In other words, only exceptions to normal operating and machine application conditions are reported, thus minimizing the data and analysis which needs to be reviewed by service personnel, operations and production personnel, condition monitoring analyst, and the like. For example, if the rate of change of engine oil pressure during last 100 hours crosses a predetermined threshold of 15%, the analyzer 108 generates an engine oil pressure exception. As described above, the analyzer 108 is configured to analyze the machine data and determine a plurality of exceptions associated with the machine parameters that fail to meet the corresponding predetermined thresholds and/or predetermined ranges of values.

The system 104 includes the rules engine 110 to process the exceptions generated by the analyzer 108. The rules engine 110 is communicatively coupled to the analyzer 108. The rules engine 110 is configured to process the exceptions in accordance with a plurality of predefined rules and generate a smart exception. The smart exception is a hierarchical combination of one or more exceptions. In other words, the rules engine 110 is configured to replace the one or more exceptions with the smart exception generated in accordance with the plurality of predefined rules. This further minimizes the data and analysis which needs to be reviewed by service personnel, operations and production personnel, condition monitoring analyst, and the like. In one embodiment, the rules engine 110 may process the exceptions using predefined rules authored manually using the expertise of service personnel, condition monitoring analyst, site manager, fleet advisor, operations and production personnel, subject matter expert, and the like. A person skilled in the art will appreciate that predefined rules may be authored manually by combining knowledge from multiple sources such as data of exceptions generated in the past, site conditions, machine fault history, service personnel expertise, dealer expertise, global fleet data, and the like. For example, one can develop a rule that if there is a first exception reporting that boost pressure is low and a second exception reporting that exhaust temperature is high then the rules engine 110 generates a smart exception reporting that there is a leak in the exhaust system as high boost pressure and high exhaust temperature signifies a leak in the exhaust system.

In another embodiment, the rules engine 110 may process the exceptions using rules developed by analyzing the exceptions related data. Automated analysis of past exceptions data may reveal certain patterns and scenarios which can be framed into rules for generating smart exceptions. The rules engine 110 may comprise a rules developer 111 to generate analytics based rules using machine learning algorithms. The rules engine 110 may process the exceptions using the analytics based rules generated by the rules developer 111. For example, the rules developer 111 may learn from the past exceptions data and develop a rule that whenever exhaust temperature is high and intake manifold pressure difference is high, then a bellow leak has happened. The rules engine 110 accordingly generates a smart exception reporting the bellow leak upon receiving exceptions corresponding to high exhaust temperature and high intake manifold pressure difference.

The system 104 further includes an interface 112 for displaying a notification in the event of the smart exception. The interface 112 is communicatively coupled to the rules engine 110. The interface 112 may include a display (not shown). However, other types of interface, such as, for example, a hand held computing device, voice recognition means, a touch screen, or the like, may be used to interface with the system 104. In one embodiment, the interface 112 is a web interface, such as a web page of the machine. It may be contemplated that a service personnel or a condition monitoring analyst using the system 104 may access the web page of the machine 102 to view the smart exception data associated with machine 102. Additionally, the web page of the machine 102 may provide data of all the exceptions generated by the analyzer 108. For this, the interface 112 may be communicatively coupled to the analyzer 108 to receive data of all the exceptions. Upon receiving the notification, a servicing operation may be scheduled to rectify the exceptions and/or replace the respective machine components associated with the exceptions. Further, the exceptions and associated resolution of the exceptions may be stored as feedback in the data store 106. In this way, the system 104 may learn from its operation and develop a knowledge source comprising various exceptions and associated resolutions which may be utilized to appropriately modify the analytical models within the analyzer 108.

The notification may be relayed from the system 104 to a user device (not shown). The user device may be a handheld mobile device, such as a cellular phone. In various alternative embodiments, the user device may be a desktop PC, laptop, a tablet PC, a personal digital assistant (PDA), etc. In an embodiment, the user device may be a computing device of the machine 102 or a different machine. It may be contemplated, that the user device may be used by a user such as an operator of the machine 102, and/or a service personnel etc., to monitor the machine 102.

The data store 106, the analyzer 108, the rules engine 110, and the interface 112 may reside on a single computer or a server, as is well known in the art. Alternatively, each of these components 106, 108, 110, and 112 may reside on its own computer or server or in any combination, depending, at least in part, on the complexity of the installation, the number of machines providing data to the system 104, and the amount of data being processed.

Figure 2:
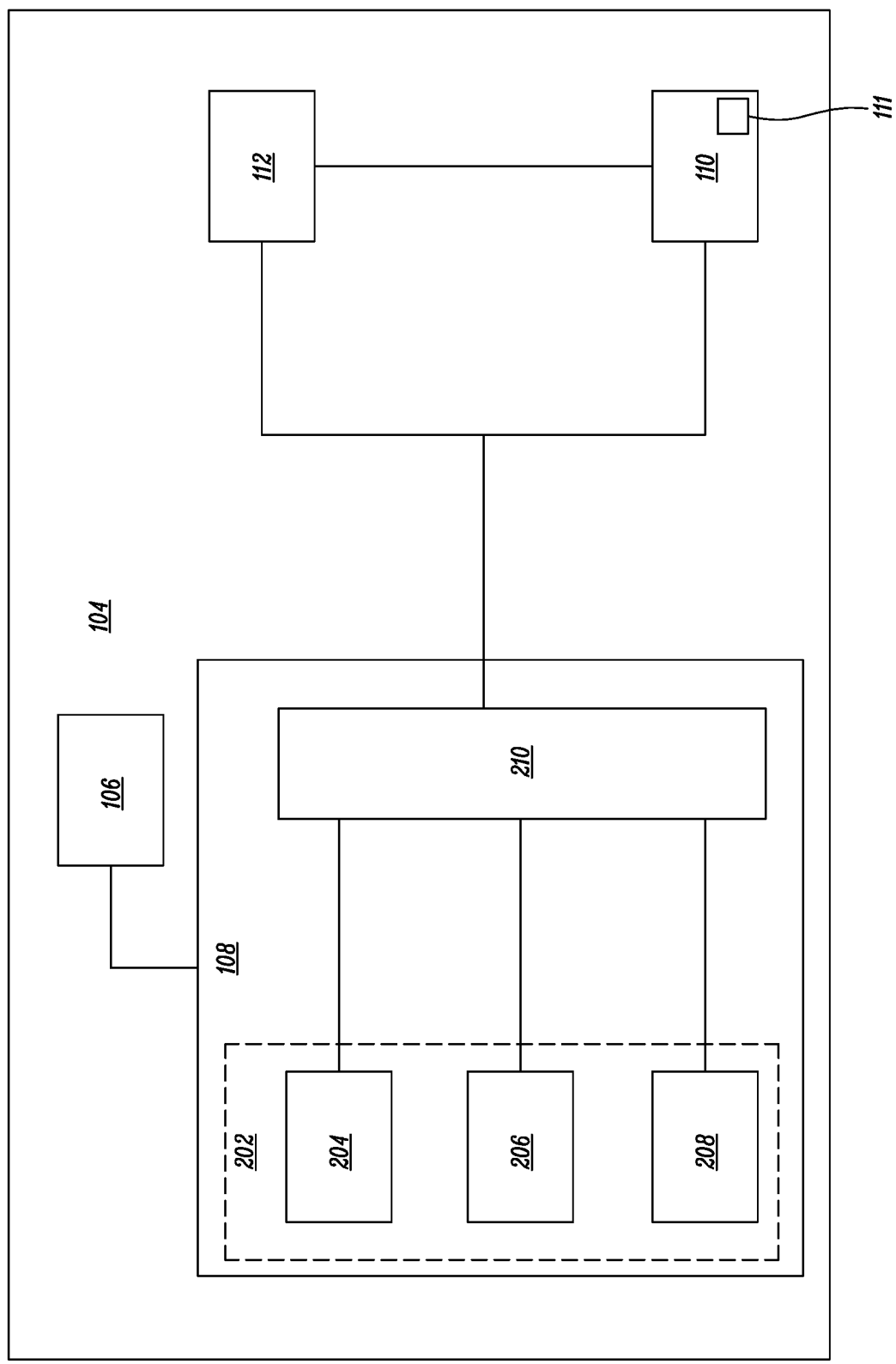
FIG. 2 is a block diagram that illustrates the various components of a system for analyzing machine data, in accordance with the concepts of the present disclosure.

FIG. 2 is a block diagram of the system 104 for analyzing machine data, according to an aspect of the present disclosure. The system 104 includes the data store 106 which is communicatively coupled to the machine 102. The data store 106 is connected to the machine 102 via the communication network 114. The data store 106 is configured to receive machine data from the machine 102. In some embodiments, the data store 106 receives machine data from the machine monitoring module 103 associated with the machine 102. The machine monitoring module 103 comprises a plurality of sensors 105 residing on various components of the machine 102 to collect machine data. The machine monitoring module 103 collects data related to one or more machine parameters i.e. the operating conditions of the machine 102, such as, for example, engine RPM, oil pressure, water temperature, boost pressure, oil contamination, electric motor current, hydraulic pressure, system voltage, exhaust temperature, and the like and related to other application conditions of the machine 102, such as, for example, payload, tire performance, underfoot conditions and the like.

The system 104 includes the analyzer 108 to analyze the machine data. The analyzer 108 is communicatively coupled to the data store 106. The analyzer 108 receives machine data from the data store 106 and analyzes the received machine data for diagnostics and prognostics. In case of plurality of machines, the analyzer 108 may be configured to analyze machine data for a plurality of machine types. As shown in FIG. 2, the analyzer 108 comprises an analytics module 202 and an exception collector 210. The analytics module 202 comprises a plurality of analytics engines 204, 206, 208 to process the machine data obtained from the data store 106. Upon receiving machine data, the analyzer 108 is configured to select one or more analytics engines from the analytics module 202 based on a type of the machine and a type of the machine parameter. A person skilled in the art will appreciate that other data associated with the machine 102 including site conditions, application conditions, repair history, exceptions history, machine usage history, and the like may also be used to select the analytics engines.

The analytics module 202 is configured to analyze the machine data and generate exceptions. The analytics module 202 receive the machine data and perform analytics on the machine data using one or more analytical models that are pre-configured in each of the analytics engines. For example, one analytics engine may be configured with high/low analytical model that generates an exception when a machine parameter is outside the range of corresponding predetermined high/low thresholds. Various types of analytical models that may be used are rate of change, high/low, statistical model, event analyzer, and the like. In one example, rate of change analytical model analyzes a rate of change of a machine parameter over last 100 hours and generates an exception when the rate of change of the machine parameter exceeds a corresponding predetermined threshold. In another example, statistical analytical model analyzes a machine parameter data over last 500 hours and generates an exception when the machine parameter crosses corresponding predetermined upper and lower 3 sigma thresholds. A person skilled in the art will appreciate that the analytical models mentioned above are merely described for illustrative purposes and various other analytical models to analyze the machine parameters are also possible. As an example, the analyzer 108 uses 21 analytical models to analyze the machine data and generates 20,000 exceptions per month.

Each analytics engine may be configured with a plurality of exception types corresponding to the machine data. The exception type represents a type of the machine parameter that is being analyzed by the analytics engine. For example, engine oil pressure is an exception type for the data provided by the engine oil pressure sensor. In other words, the exception type represents the type of machine parameter that is being input to an analytical engine. The analyzer 108 may be preconfigured with a list of exception types based on the type of the machine 102, application conditions, site conditions, and the like. When any analytics engine receives machine data at the input, the analytics engine may be configured to automatically identify an exception type corresponding to the input machine data from the list of exception types. The exception type parameter helps in better organization of the exception data as the exceptions generated from multiple analytics engines may be grouped together based on the exception type. For example, an exception with an exception type "engine oil pressure" may be generated by the high/low analytics engine and another exception with the exception type "engine oil pressure" may be generated by the rate of change analytics engine. These exceptions can be grouped together by the exception collector 210 as both have the same exception type.

The analytics engines are configured to generate exceptions based on the outcome of the analysis performed on the machine data. In an exemplary embodiment, the exception data may include a qualifier associated with the exception. The qualifier represents the condition of the exception. The qualifier may have value such as high, low, red, yellow, and the like, depending on the analytical model used. For example, if a high/low analytics engine performs analysis on the engine oil pressure data and identifies that the engine oil pressure is lower than the corresponding predetermined thresholds, an exception with exception type "engine oil pressure" and qualifier "low" is generated by the high/low analytics engine.

In an exemplary embodiment, the exception data may further include a severity level associated with the exception. The severity level is indicative of a criticality of the failure of the machine 102. For example, the severity level may be a rating such as Level 1 and Level 2 severity corresponding to low criticality failures, Level 3 severity corresponding to medium criticality failures and Level 4 and Level 5 severity corresponding to high criticality failures. The severity levels may be associated with each of the exceptions generated by the analytics engines. For example, the analytics engine may analyze the engine oil pressure data and generate an engine oil pressure exception with a severity level of 5 indicating that the engine oil pressure sensor needs immediate attention. Similarly, the analytics engine may generate an engine coolant temperature exception with a severity level of 2 indicating a medium criticality associated with this failure. A person skilled in the art will appreciate that indication of the severity level by Level 1, Level 2, Level 3, Level 4, and Level 5 is merely described for illustrative purposes and other ways to indicate the severity level are also possible. For example, the severity level may be indicated by High, Medium and Low. Further, more than five or less than five levels of severity may be defined.

In one embodiment, the analytics module 202 may be configured to use predictive analytics techniques to analyze the machine data. The predictive analytics may include comparing the machine data with standard operating ranges of the machine, comparing the machine data with the corresponding data of the machine captured in the past under similar operating conditions, and comparing the machine data with the corresponding data of other machines captured in the past under similar operating conditions. In one embodiment, the analytics module 202 comprises a first set of analytics engines 204, a second set of analytics engines 206, and a third set of analytics engines 208 as shown in FIG. 2. The first set of analytics engines 204 is configured to compare the machine parameters with predetermined thresholds and/or range of values which correspond to standard operation of the machine 102. The exceptions generated by the first set of analytics engines 204 represent that one or more machine parameters are not within the standard operational limits of the machine 102.

The second set of analytics engines 206 is configured to compare the machine parameters to the corresponding parameters of the machine 102 captured in the past when the machine 102 was operating under similar operating conditions. For example, an engine oil pressure of the machine 102 is compared with the past values of the engine oil pressure when the machine 102 was operating under similar operating conditions. In case, the second set of analytics engines 206 determine that a machine parameter is significantly deviating from its past values, an exception may be generated. The exceptions generated by the second set of analytics engines 206 represent that the machine data is not conforming to the corresponding machine data captured in the past when the machine 102 was operating under similar operating conditions.

The third set of analytics engines 208 is configured to compare the machine parameters with the corresponding machine parameters of other similar machines while operating under similar operating conditions. For example, an engine oil pressure of the machine 102 is compared with the engine oil pressure data of several similar machines (e.g. present in the same fleet) while operating under similar operating conditions. As an example, the third set of analytics engines 208 may use an association model to analyze the repair history data of similar machines in the fleet and identify the probability of certain combination of repairs for the machine 102. In case, the third set of analytics engines 208 determine that a machine parameter is significantly deviating from the values of the same machine parameter of other similar machines while operating under similar operating conditions, an exception may be generated. The exceptions generated by the third set of analytics engines represent that the machine data is not conforming to the corresponding machine data of other machines operating under similar operating conditions (e.g. present in the same fleet).

In an exemplary embodiment, the exceptions generated by the analytics module 202 may be provided to an exception collector 210. The exception collector 210 is configured to receive the exceptions and group them based on the exception type. For example, the exception collector 210 may be configured to group all the exceptions having an exception type "engine oil pressure". In other words, the exceptions are organized by the exception collector 210 based on the exception type.

The system 104 includes the rules engine 110 to process the exceptions generated by the exception collector 210. The rules engine 110 is communicatively coupled to the analyzer 108 and is configured to receive the exceptions data from the analyzer 108. The rules engine 110 is configured to process the exceptions in accordance with a plurality of predefined rules and generate the smart exception. The smart exception is a hierarchical combination of one or more exceptions. In other words, the rules engine 110 is configured to replace the one or more exceptions with the smart exception generated in accordance with the plurality of predefined rules.

In one embodiment, the rules engine 110 may process the exceptions using predefined rules authored manually using the expertise of service personnel, condition monitoring analyst, site manager, fleet advisor, operations and production personnel, subject matter expert, and the like. In another embodiment, the rules engine 110 may process the exceptions using rules developed by analyzing the exceptions related data. Automated analysis of past exceptions data may reveal certain patterns and scenarios which can be framed into rules for generating smart exceptions. The rules engine 110 may comprise the rules developer 111 to generate analytics based rules using machine learning techniques. The rules engine 110 may process the exceptions using the analytics based rules generated by the rules developer 111.

The system 104 further includes the interface 112 for displaying the notification in the event of the smart exception. The interface 112 is communicatively coupled to the rules engine 110. In one embodiment, the interface 112 is a web interface, such as a web page of the machine 102. It may be contemplated that a service personnel or a condition monitoring analyst using the system 104 may access the web page of the machine 102 to view the smart exception data associated with machine 102. Additionally, the web page of the machine may provide data of all the exceptions generated by the analyzer 108. For this, the interface 112 may be communicatively coupled to the analyzer 108 to receive data of all the exceptions. Upon receiving the notification, a servicing operation may be scheduled to rectify the exceptions and/or replace the respective machine components associated with the exceptions. Further, the exceptions and associated resolution of the exceptions may be stored as feedback in the data store 106. In this way, the system 104 may learn from its operation and develop a knowledge source comprising various exceptions and associated resolutions which can be utilized to appropriately modify the analytical models within the analyzer 108.

Figure 3:
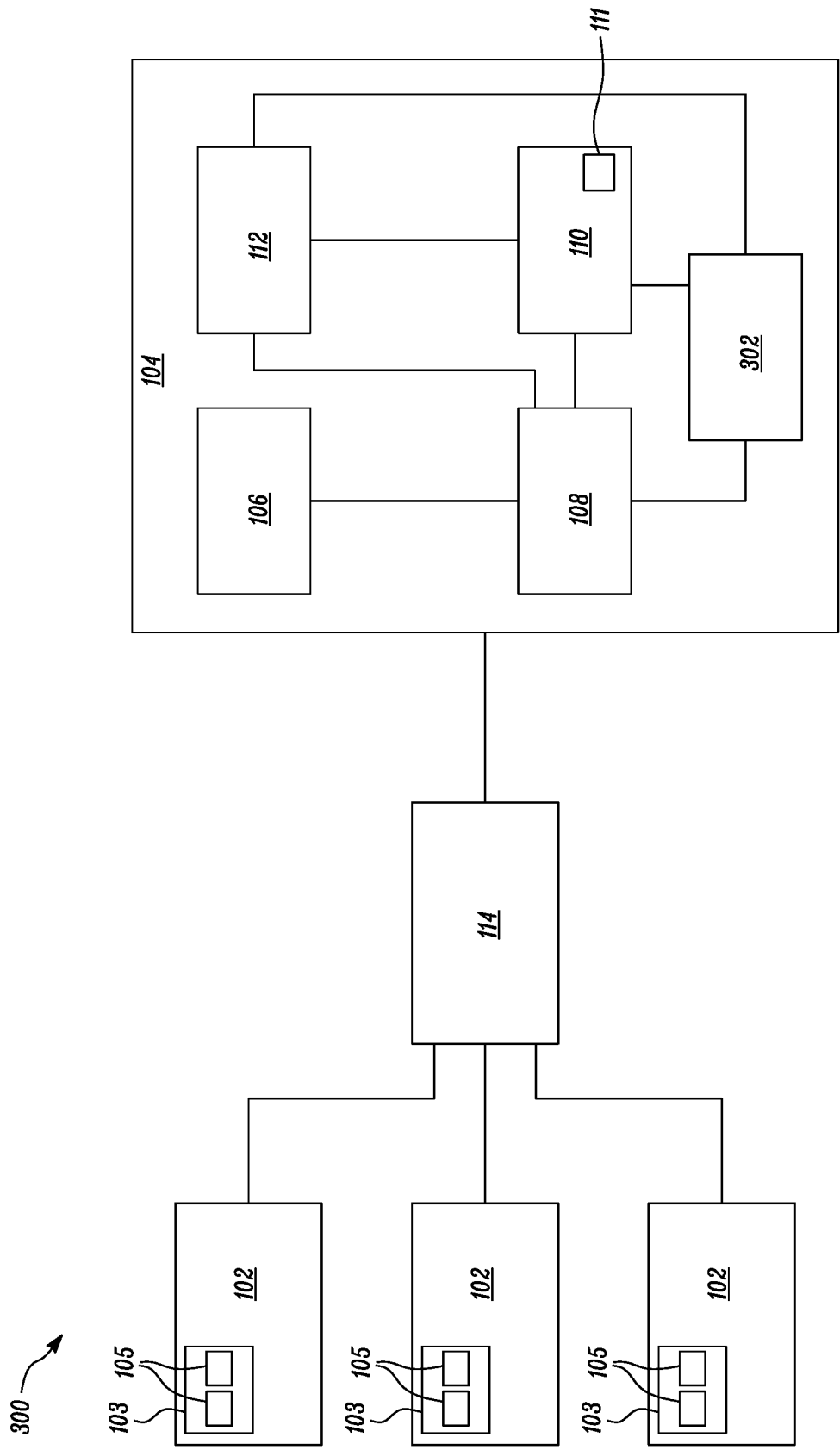
FIG. 3 is a block diagram that illustrates the various components of a system for generating repair recommendations for a machine, in accordance with the concepts of the present disclosure.

Referring to FIG. 3, the system 104 includes a recommendation engine 302 configured to automatically provide repair recommendations for the machine 102. The recommendation engine 302 is communicatively coupled to the analyzer 108 to receive the exceptions generated by the analytics engines. The recommendation engine 302 may utilize information from various knowledge sources such as machine user manuals, repair history, site conditions, expert knowledge, machine usage history, past exceptions data and associated rectifications, and the like. A person skilled in the art will appreciate that there may be several other sources of information related to machine maintenance, machine fault diagnostics, and in general, machine operation, that may be used for automatically generating repair recommendations for the machine. The generated repair recommendations are forwarded to the interface 112 for display to the service personnel or the like, for taking appropriate action in accordance with the repair recommendation.

The present invention (i.e., machine environment 100 or any part(s) or function(s) thereof) may be implemented using hardware, software, or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in most cases, in any of the operations described herein, which form a part of the present invention. Rather, the operations are machine operations. Useful machines for performing the operations in the present invention may include general-purpose digital computers or similar devices.

Figure 4:
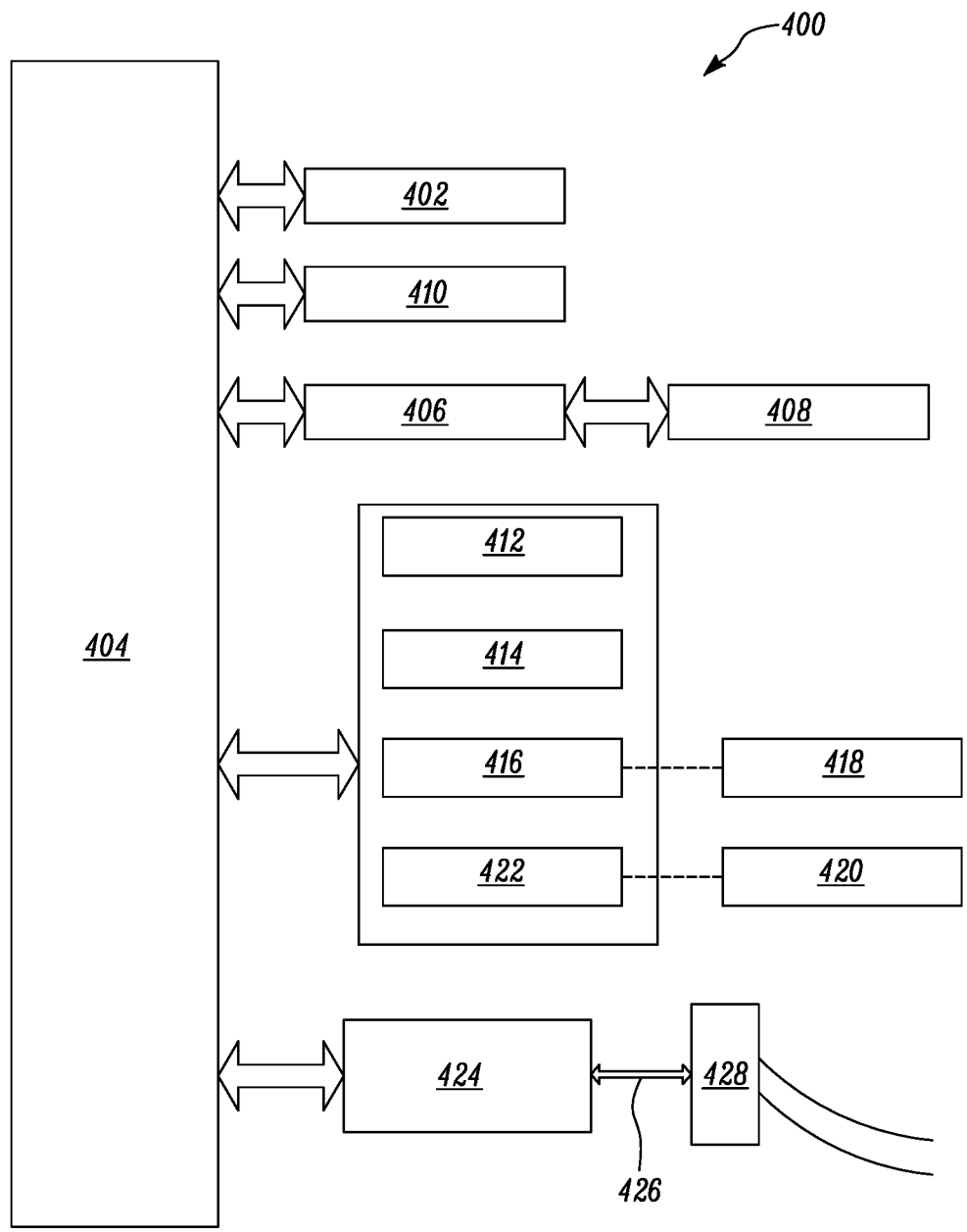
FIG. 4 is a block diagram of an exemplary computer system for implementing the present invention.

In fact, in accordance with an embodiment, the present invention is directed towards one or more computer systems capable of carrying out the functionality described herein. An example of the computer systems includes a computer system 400, which is shown in FIG. 4.

Computer system 400 includes at least one processor, such as a processor 402. Processor 402 is connected to a communication infrastructure 404, for example, a communications bus, a cross-over bar, a network, and the like. Various software embodiments are described in terms of this exemplary computer system 400. After reading this description, it will become apparent to a person skilled in the relevant art(s) how to implement the present invention using other computer systems and/or architectures.

Computer system 400 includes a display interface 406 that forwards graphics, text, and other data from communication infrastructure 404 for display on a display unit 408.

Computer system 400 further includes a main memory 410, such as random access memory (RAM), and may also include a secondary memory 412. Secondary memory 412 may further include, for example, a hard disk drive 414 and/or a removable storage drive 416, representing a floppy disk drive, a magnetic tape drive, an optical disk drive, etc. Removable storage drive 416 reads from and/or writes to a removable storage unit 418 in a well known manner. The removable storage unit 418 may represent a floppy disk, magnetic tape, or an optical disk and may be read by and written to by removable storage drive 416. As will be appreciated, removable storage unit 418 includes a computer usable storage medium having stored therein computer software and/or data.

In accordance with various embodiments of the present invention, secondary memory 412 may include other similar devices for allowing computer programs or other instructions to be loaded into computer system 400. Such devices may include, for example, a removable storage unit 420, and a storage interface 422. Examples of such may include a program cartridge and a cartridge interface (such as that found in video game devices), a removable memory chip (such as an erasable programmable read only memory (EPROM) or programmable read only memory (PROM)) and an associated socket, and other removable storage units 420 and interfaces 422, which allow software and data to be transferred from removable storage unit 420 to computer system 400.

Computer system 400 may further include a communication interface 424. Communication interface 424 allows software and data to be transferred between computer system 400 and external devices. Examples of communication interface 424 include, but may not be limited to a modem, a network interface (such as an Ethernet card), a communications port, a Personal Computer Memory Card International Association (PCMCIA) slot and card, and the like. Software and data transferred via communication interface 424 are in the form of a plurality of signals, hereinafter referred to as signals 426, which may be electronic, electromagnetic, optical, or other signals capable of being received by communication interface 424. Signals 426 are provided to communication interface 424 via a communication path (e.g., channel) 428. Communication path 428 carries signals 426 and may be implemented using wire or cable, fiber optics, a telephone line, a cellular link, a radio frequency (RF) link, and other communication channels.

In this document, the terms "computer program medium" and "computer readable medium" are used to generally refer to media such as removable storage drive 416, a hard disk installed in hard disk drive 414, signals 426, and the like. These computer program products provide software to computer system 400. The present invention is directed to such computer program products.

Computer programs (also referred to as computer control logic) are stored in main memory 410 and/or secondary memory 412. Computer programs may also be received via communication infrastructure 404. Such computer programs, when executed, enable computer system 400 to perform the features of the present invention, as discussed herein. In particular, the computer programs, when executed, enable processor 402 to perform the features of the present invention. Accordingly, such computer programs represent controllers of computer system 400.

In accordance with an embodiment of the invention, where the invention is implemented using software, the software may be stored in a computer program product and loaded into computer system 400 using removable storage drive 416, hard disk drive 414, or communication interface 424. The control logic (software), when executed by processor 402, causes processor 402 to perform the functions of the present invention as described herein.

In another embodiment, the present invention is implemented primarily in hardware using, for example, hardware components such as application specific integrated circuits (ASIC). An implementation using hardware to perform the functions described herein will be apparent to persons skilled in the relevant art(s).

In yet another embodiment, the present invention is implemented using a combination of both the hardware and the software.

INDUSTRIAL APPLICABILITY

The present disclosure provides the system 104 for analyzing machine data associated with the operation of the machine 102 as shown in FIG. 1. The system 104 includes the data store 106, the analyzer 108, the rules engine 110, and the interface 112. The data store 106 is configured to receive and store machine data from the machine 102. In an exemplary embodiment, machine data comprises exhaust temperature and intake manifold pressure difference data. The analyzer 108 is configured to analyze the machine data received from the data store 106. The analyzer 108 analyzes the machine data to detect issues with the machine 102 as well as predict upcoming issues with the machine 102. The analyzer 108 comprises plurality of analytics engines to perform different types of analysis on machine data and generate one or more exceptions. Upon receiving machine data, the analyzer 108 is configured to select one or more analytics engines from plurality of analytics engines based on the type of the machine and the type of the machine parameter. In an exemplary embodiment, the analyzer 108 receives the exhaust temperature and intake manifold pressure difference data. As an example, the analyzer 108 selects high/low analytics engine for analyzing the exhaust temperature and intake manifold pressure difference data. The analyzer 108 generates exceptions based on the comparison of the exhaust temperature data and intake manifold pressure difference data with the corresponding thresholds.

The rules engine 110 is configured to process the exceptions in accordance with a plurality of predefined rules and generate a smart exception. The smart exception is a hierarchical combination of one or more exceptions. In an exemplary embodiment, the rules engine 110 applies a rule that when exhaust temperature is high and the intake manifold pressure difference is high, a smart exception corresponding to "bellow leak" is generated. The interface 112 is configured to display the notification in the event of the smart exception. In an exemplary embodiment, the smart exception corresponding to "bellow leak" is displayed to service personnel on the interface. Thus, instead of reviewing 2 exceptions, the service personnel now has to review only the smart exception. In general, there are thousands of exceptions generated for the machines and the system 104 thus plays an important role in simplifying the review of these exceptions by automatically generating smart exceptions by combining one or more exceptions.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:
   memory; and
   one or more processors configured to:
      receive, from one or more sensors residing on one or more components of a machine, machine data associated with an operation of the machine;
      select one or more analytics engines, from a plurality of analytics engines, based on a type of the machine;
      determine a plurality of exceptions by analyzing the machine data using the one or more analytics engines,
      wherein the one or more analytics engines include an analytics engine to determine a rate of change of engine oil pressure over a period of time, and
      wherein, when determining the plurality of exceptions, the one or more processors are configured to:
         generate an oil pressure exception, of the plurality of exceptions, when the rate of change of engine oil pressure over the period of time crosses a predetermined percentage threshold of a list of predetermined thresholds that indicate a normal operating condition;
      process at least two of the plurality of exceptions to determine a smart exception using a rule that is based on past exceptions data,
         wherein the smart exception is based on the at least two of the plurality of exceptions,
         wherein the at least two of the plurality of exceptions are related to one or more of:
            a boost pressure,
            an exhaust temperature,
            intake manifold pressure, or
            oil pressure, and
         where the smart exception indicates an issue that includes a leak in an exhaust system, a bellow leak, or another issue with regards to another component of the machine; replace one or more exceptions, of the plurality of exceptions, with the smart exception; and provide a notification based on the smart exception,
      wherein the notification is associated with a service operation that is scheduled to rectify the issue to replace one or more components of the machine associated with the issue.

2. The system of claim 1, wherein the one or more processors are further configured to:
   relay the machine data from the machine to a data store.

3. The system of claim 2, wherein the data store is configured to receive the machine data in a form of at least one of data packets, streaming data, or batched data files.

4. The system of claim 1, wherein, when providing the notification, the one or more processors are configured to:
   provide the notification via a web interface.

5. The system of claim 1, wherein the one or more analytics engines are selected further based at least on one of site conditions, application conditions, or machine usage history.

6. The system of claim 1,
   wherein the smart exception is determined using analytics based rules, and
   wherein the analytics based rules include the rule.

7. The system of claim 1, wherein the rule is generated using machine learning algorithms.

8. The system of claim 1, wherein the one or more processors are further configured to:
   generate one or more repair recommendations for the machine based on the plurality of exceptions.

9. The system of claim 1, wherein the one or more processors are further configured to:
   provide, for display, a notification for each of the plurality of exceptions.

10. A non-transitory computer-readable medium storing instructions, the instructions comprising:
    one or more instructions that, when executed by a system for remotely monitoring a machine, cause the system to:
       receive, from one or more sensors residing on one or more components of a machine, machine data associated with an operation of the machine;
       select one or more analytics engines, from a plurality of analytics engines, based on a type of the machine;
       determine, using the one or more analytics engines, a plurality of exceptions analyzing the machine data,
          wherein the one or more analytics engines include an analytics engine to determine a rate of change of pressure over a period of time, and
          wherein the plurality of exceptions include a pressure exception that is determined when the rate of change of pressure over the period of time crosses a predetermined percentage threshold of a list of thresholds that indicate a normal operating condition;
       generate a smart exception based on at least a combination of two of the plurality of exceptions,
          wherein the at least two of the plurality of exceptions are related to one or more of:
             a boost pressure,
             an exhaust temperature,
             intake manifold pressure, or
             oil pressure, and
          wherein the smart exception indicates an issue that includes a leak in an exhaust system, a bellow leak, or another issue with regards to another component of the machine;
       replace one or more exceptions, of the plurality of exceptions, with the smart exception; and
       provide a notification based on the smart exception,
          wherein the notification is associated with a service operation that is scheduled to rectify the issue or to replace one or more components of the machine associated with the issue.

11. The non-transitory computer-readable medium of claim 10, wherein the machine data is received via a communication network.

12. The non-transitory computer-readable medium of claim 10, wherein the data store is configured to receive the machine data in a form of at least one of data packets, streaming data, or batched data files.

13. The non-transitory computer-readable medium of claim 10, wherein the notification is provided, for display, in a web interface.

14. The non-transitory computer-readable medium of claim 10, wherein the one or more analytics engines are further selected based on site conditions.

15. The non-transitory computer-readable medium of claim 10, wherein the smart exception is generated using analytics based rules.

16. The non-transitory computer-readable medium of claim 15, wherein the analytics based rules are generated using machine learning algorithms.

17. The non-transitory computer-readable medium of claim 10, wherein the one or more instructions further cause the system to:
   provide a notification for each of the plurality of exceptions.

18. A method comprising:
   receiving, by a computer system and from one or more sensors residing on one or more components of a machine, machine data associated with an operation of the machine;
   selecting, by the computer system, one or more analytics engines, from a plurality of analytics engines, based on a type of the machine;
   analyzing, by the computer system, the machine data using the one or more analytics engines to determine a plurality of exceptions,
      wherein the one or more analytics engines include an analytics engine to determine a rate of change of engine oil pressure over a period of time, and
      wherein determining the plurality of exceptions comprises:
         generating an oil pressure exception, of the plurality of exceptions, when the rate of change of engine oil pressure over the period of time crosses a predetermined percentage threshold of a one or more thresholds that indicate a normal operating condition;
   processing, by the computer system, at least two of the plurality of exceptions to determine a smart exception,
      wherein the smart exception is a combination of the at least two of the plurality of exceptions,
      wherein the at least two of the plurality of exceptions are related to one or more of:
         a boost pressure,
         an exhaust temperature,
         intake manifold pressure, or
         oil pressure,
      wherein the smart exception indicates an issue that includes a leak in an exhaust system, a bellow leak, or another issue with regards to another component of the machine, and
      wherein processing of at least two of the plurality of exceptions is performed using one or more rules that are based on past exceptions data; and
   providing, by the computer system, a notification based on the smart exception,
      wherein the notification is associated with a service operation that is scheduled to rectify the issue or to replace one or more components of the machine associated with the issue.

19. The method of claim 18, wherein the past exceptions data indicates one or more patterns or scenarios.

20. The method of claim 18, wherein the one or more analytics engines are selected further based at least on one of site conditions, application conditions, or machine usage history.

* * * * *